United States Patent
Heaton et al.

(10) Patent No.: US 7,130,493 B2
(45) Date of Patent: Oct. 31, 2006

(54) TRAVELLING-WAVE GUIDE ELECTRO-OPTIC MODULATOR

(75) Inventors: John Michael Heaton, Worcester (GB); Philippa Julia Mary Parmiter, Worcester (GB)

(73) Assignee: Qinetiq Limited(GB)

( * ) Notice: Subject to any disclaimer, the term of this patent is extended or adjusted under 35 U.S.C. 154(b) by 103 days.

(21) Appl. No.: 10/466,594

(22) PCT Filed: Jan. 14, 2002

(86) PCT No.: PCT/GB02/00118

§ 371 (c)(1), (2), (4) Date: Jul. 17, 2003

(87) PCT Pub. No.: WO02/057844

PCT Pub. Date: Jul. 25, 2002

(65) Prior Publication Data

US 2004/0052443 A1    Mar. 18, 2004

(30) Foreign Application Priority Data

Jan. 19, 2001    (GB) .................................. 101343.2

(51) Int. Cl.
G02B 6/26    (2006.01)
G02B 6/42    (2006.01)
G02F 1/035   (2006.01)

(52) U.S. Cl. ............................................. 385/3; 385/40
(58) Field of Classification Search .................... 385/2, 385/3, 8, 14, 39, 40, 129–131; 359/237, 359/238, 315, 320
See application file for complete search history.

(56) References Cited

U.S. PATENT DOCUMENTS

| 4,583,817 | A |   | 4/1986  | Papuchon ..................... 385/40 |
| 5,303,079 | A |   | 4/1994  | Gnauck et al. ............. 398/182 |
| 5,459,799 | A | * | 10/1995 | Weber ............................ 385/2 |
| 5,479,552 | A | * | 12/1995 | Kitamura et al. ............ 385/132 |
| 5,491,768 | A |   | 2/1996  | Chan ........................... 385/132 |
| 5,535,045 | A |   | 7/1996  | Dutta et al. ................. 359/248 |
| 5,687,265 | A | * | 11/1997 | Nishimoto et al. ........... 385/40 |
| 6,415,083 | B1 | * | 7/2002 | Anderson et al. ............. 385/40 |
| 6,633,692 | B1 | * | 10/2003 | Chua et al. .................... 385/16 |

FOREIGN PATENT DOCUMENTS

GB    2165956         4/1986
JP    06075195 A  *  3/1994

OTHER PUBLICATIONS

Walker, "High Speed III-V Semiconductor, Intensity Modulators", *IEEE Journal of Quantum Electronics*, vol. 27, pp. 654-667 (1991).
Bourke et al., "Fabrication of low loss GaAs/AlGaAs Mach Zehnder modulators using proton isolation", *Proceedings of the SPIE*, vol. 3290, pp. 221-226 (1998).

* cited by examiner

*Primary Examiner*—Sung Pak
*Assistant Examiner*—Daniel Petkovsek
(74) *Attorney, Agent, or Firm*—McDonnell Boehnen Hulbert & Berghoff LLP

(57) ABSTRACT

A Mach-Zehnder type electro-optic modulator based, for example, on GaAs/GaAlAs of InP/InGaAsP comprises coplanar stripline (CPS) electrodes, and optical waveguides, disposed on a conducting substrate or a conducting epitaxial layer, wherein the regions underlying the CPS electrodes are selectively rendered insulating by ion implantation to electrically isolate the CPS electrodes.

25 Claims, 5 Drawing Sheets

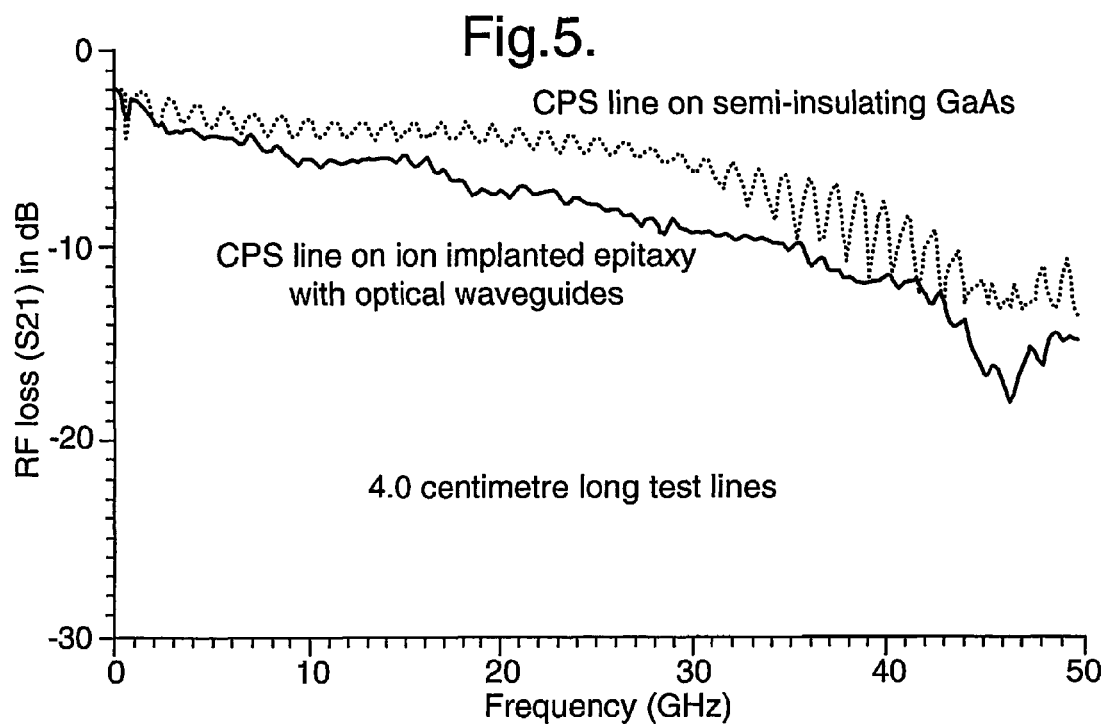
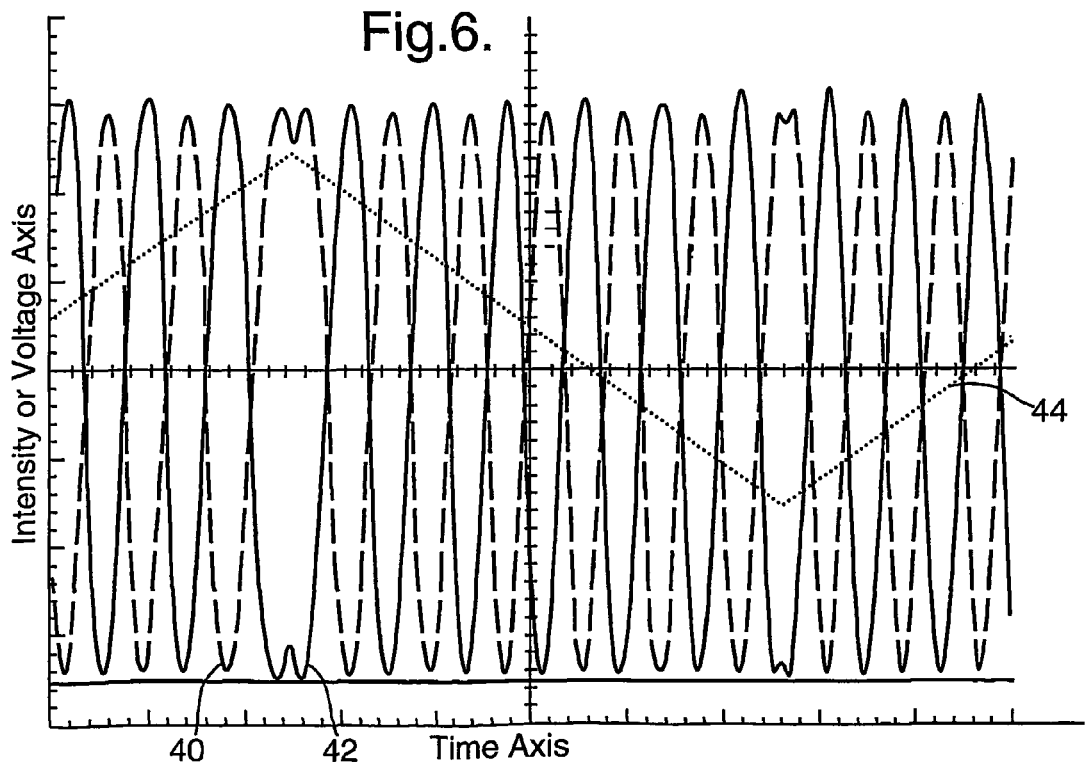

TRAVELLING-WAVE GUIDE ELECTRO-OPTIC MODULATOR

This application is a 371 of PCT/GB02/010118, filed on Jan. 14, 2002, which claims priority to GB0101343.2, filed on Jan. 19, 2001.

BACKGROUND OF THE INVENTION

1. Field of the Invention

The present invention relates to electro-optic waveguide devices, in particular to electro-optic modulators, to a method of fabricating travelling-wave RF electro-optic modulators and devices produced thereby.

2. Discussion of Prior Art

Conventional wafer based waveguides provide a convenient means for guiding light within a semiconductor wafer. In such waveguides light is confined within a core layer by cladding layers, exhibiting a lower refractive index than the core material, arranged above and below the core layer. Light is confined at the edges of the waveguide by the core/air interface.

For example, such waveguides can be fabricated from III–V semiconductors such as lattice matched GaAs/AlGaAs. In this example the refractive index of the general material $Al_xGa_{(1-x)}As$ depends on the aluminium mole fraction (x). Propagation of light may be confined primarily to the plane of the semiconductor wafer by growing epitaxial layers of $Al_xGa_{(1-x)}As$ with different values of the aluminium mole fraction x. Propagation of light may be further confined to a narrow waveguide by etching the requisite waveguide pattern into the $Al_xGa_{(1-x)}As$ layers.

It is well known that the optical properties of the waveguide may be altered by applying an electric field across the waveguide. For example the refractive index of the waveguide core (and the upper cladding layer) may be altered via the linear electro-optic effect (Pockels effect), which in turn may be used to alter the phase of light passing through the waveguide.

In practice, the core and upper cladding layers are undoped and behave effectively as insulators. The lower cladding layers are usually doped to provide a conducting layer below the waveguide. The substrate is usually undoped and also behaves effectively as an insulator. By placing an electrode on the top of the waveguide, and a second electrode in contact with the doped lower cladding layer, an electric field can be applied across the guiding region by applying a voltage between the upper and lower electrodes. Accordingly, the refractive index of the waveguide core, and hence the phase of light passing through the waveguide, may be modulated electrically.

This effect provides the basis for electro-optic waveguide interferometers in which light can be switched from one output to another by applying an electric field across the waveguide.

The linear electro-optic effect is a very fast effect, and the switching speed of the waveguide interferometer depends mainly on how quickly the voltage can be applied to the electrodes. For a simple electro-optic waveguide interferometer the switching speed will be limited by the capacitance of the electrode, or in practice, by the capacitance of the bond pad used to connect a wire to the electrode.

The linear electro-optic effect is however a weak effect, necessitating long electrodes (of the order of tens of millimeters in length) within the device in order to keep the drive voltage at acceptable levels. The length of the electrode can cause complications if the device is to be operated at very high switching speeds (for example where the interferometer is switched at radio frequencies (RF) of the order of 50 GHz) since the length of the electrode is long compared to the wavelength of the RF drive signal (for example, a 50 GHz drive signal has a wavelength of 6 mm in air). This means the transit time of the light under the electrode would correspond to a few RF cycle periods. The light would be phase shifted in one direction by the positive half-cycles of the RF drive signal, and then phase shifted in the opposite direction by the negative half-cycles, before it has had time to pass under the full length of the electrode. The total phase shift would be small, if not zero, and so the device would not be very efficient.

To overcome this effect, the RF wave must be made to travel along the device in the same direction, and at the same speed, as the light in the waveguides. In this manner the same part of the RF wave always acts on the same part of the light beam, and the required optical phase shift grows continuously as the light propagates along the device. This type of device is called a "travelling-wave" electro-optic waveguide modulator.

One of the main difficulties in making this type of travelling-wave electro-optic modulator is that the epitaxy needed to apply the RF drive signal to the waveguide has to have conducting lower cladding layers in order to confine the applied field strongly in the core and upper cladding layers only.

Due to the high frequency of the drive signal, coplanar stripline is employed to route the RF drive signal to the modulator electrodes. If the coplanar stripline (CPS) were placed on top of the conducting layers of epitaxy (the doped lower cladding layer of the waveguide), the CPS line would be very lossy and the RF drive signal would propagate only a few millimeters at most before being completely attenuated by the conducting layers. Ideally, the CPS line should be placed on an insulating (or in semiconductor terms, semi-insulating) substrate to avoid severe losses. However, further processing would then be required to provide a conducting epitaxial layer beneath the waveguide in order to confine the applied field within the waveguide core and upper cladding layers.

An alternative method of reducing unwanted attenuation of the RF drive signal is to fabricate the device on a semi-insulating substrate and to etch a deep trench between the coplanar stripline primary electrodes and any conducting epitaxy employed underneath the waveguide core, thereby effectively isolating the two structures. In this configuration bridging electrodes are utilised to span the trench between the coplanar stripline and the waveguide [see for example "High-speed III–V semiconductor intensity modulators", Walker R G, IEEE Journal of Quantum Electronics, 27: (3) 654–667 March 1991]. However, this isolation technique is complex and expensive due to low processing yields. The technique also results in a non-planar substrate making subsequent processing of the device more difficult.

It is an object of the present invention to provide an improved method for producing an electro-optic waveguide modulator and specifically for producing a travelling-wave electro-optic modulator.

SUMMARY OF THE INVENTION

According to the present invention, a method of fabricating an electro-optic waveguide device, having primary electrodes and at least one optical waveguide disposed on a substrate having a substantially conducting surface, comprises the steps of identifying at least one primary region on the waveguide device substrate to receive the primary electrodes identifying at least one secondary region on the waveguide device substrate to receive the at least one optical waveguide selectively implanting ions into the at least one primary region on the waveguide device substrate identified to receive the primary electrodes, thereby rendering the at least one primary region substantially insulating and leaving the at least one secondary region substantially conducting.

The method provides the advantage that parts of the waveguide device substrate may be selectively rendered substantially insulating whilst leaving other parts of the substrate substantially conducting, thereby enabling both the primary electrodes and optical waveguide to operate efficiently within the device.

In a preferred embodiment the substrate is substantially insulating and the method further comprises the initial step of growing at least one epitaxial layer onto the substrate to form a substrate exhibiting a composite structure, wherein the epitaxial layer is a substantially conducting layer.

Preferably the surface of the substrate is substantially planar following the ion-implantation process. Since the process is minimally invasive, post processing of the semiconductor substrate is simplified and processing yields improved over conventional isolation methods utilising etching processes.

In a further preferred embodiment the method further comprises the steps of depositing epitaxial layers of semiconductor material to form an electro-optic layer in the plane of the waveguide device substrate etching channels through the electro-optic epitaxial layer to form electro-optic waveguides adapted to guide light in well defined regions on the waveguide device substrate, said electro-optic waveguides being coincidental with the at least one secondary region on the waveguide device substrate identified to receive the at least one optical waveguide depositing electro-optic electrodes onto at least part of the electro-optic waveguides, thereby enabling an electric field to be applied across the electro-optic waveguides depositing primary electrodes adjacent to the electro-optic electrodes and coincidental with the at least one primary region on the modulator substrate identified to receive the primary electrodes.

Preferably the substrate and the at least one epitaxial layer comprise III–V semiconductors. The substrate and the at least one epitaxial layer may comprise layers of gallium arsenide, gallium aluminium arsenide, indium phosphide and indium gallium arsenide phosphide.

Preferably the ions implanted into the at least one primary region comprise at least one of hydrogen ions, helium ions, or boron ions In a preferred embodiment the ions exhibit energies in the range 1 MeV–1.8 MeV.

In a further preferred embodiment the electro-optic waveguide device comprises a travelling-wave electro-optic modulator. The travelling wave electro-optic modulator may be an intensity modulator, a phase modulator, or a switch.

According to a second aspect of the present invention, an electro-optic waveguide device comprises a substrate, at least one input optical waveguide and at least one output optical waveguide at least one electro-optic waveguide at least one primary electrode disposed on the substrate at least one substantially insulating primary region formed on the substrate by implanting ions into the at least one primary region at least one substantially conducting secondary region formed on the substrate wherein the at least one primary electrode is located on the at least one substantially insulating primary region on the substrate and wherein the at least one electro-optic waveguide is located on the at least one substantially conducting secondary region on the substrate.

In a preferred embodiment the electro-optic waveguide device substrate comprises a substantially insulating base stratum and at least one epitaxial layer deposited onto the base stratum, wherein the at least one epitaxial layer is a substantially conducting layer.

In another preferred embodiment the electro-optic waveguide device further comprises electro-optic electrodes deposited onto the electro-optic waveguides, thereby enabling an electric field to be applied across the at least one electro-optic waveguide.

Preferably the substrate and the at least one epitaxial layer comprise III–V semiconductors. Even more preferably the substrate and the at least one epitaxial layer comprise layers of gallium arsenide, gallium aluminium arsenide, indium phosphide and indium gallium arsenide phosphide.

In a preferred embodiment the ions implanted into the at least one primary region comprise at least one of hydrogen ions, helium ions or boron ions.

In another preferred embodiment the ions implanted into the at least one primary region exhibit energies in the range 1 MeV–1.8 MeV.

In a further preferred embodiment the electro-optic waveguide device comprises a travelling-wave electro-optic modulator. The travelling wave electro-optic modulator may be an intensity modulator, a phase modulator or a switch.

BRIEF DESCRIPTION OF THE DRAWINGS

The invention will now be described, by example only, with reference to the accompanying drawings in which;

FIG. 5 shows a graphical comparison of the loss of a coplanar stripline (CPS) on semi-insulating GaAs and a similar CPS line on GaAs with full optical waveguide epitaxy and ion implantation around the optical guides.

FIG. 6 refers to an ion implanted Mach Zehnder interferometer and shows a graph of intensity of light emerging from the output ports of the interferometer as a function of applied bias voltage. The graph demonstrates that the performance of the optical waveguide part of the device has not been affected at all by the ion implantation process.

DETAILED DESCRIPTION OF THE PREFERRED EMBODIMENTS

Figure 1:
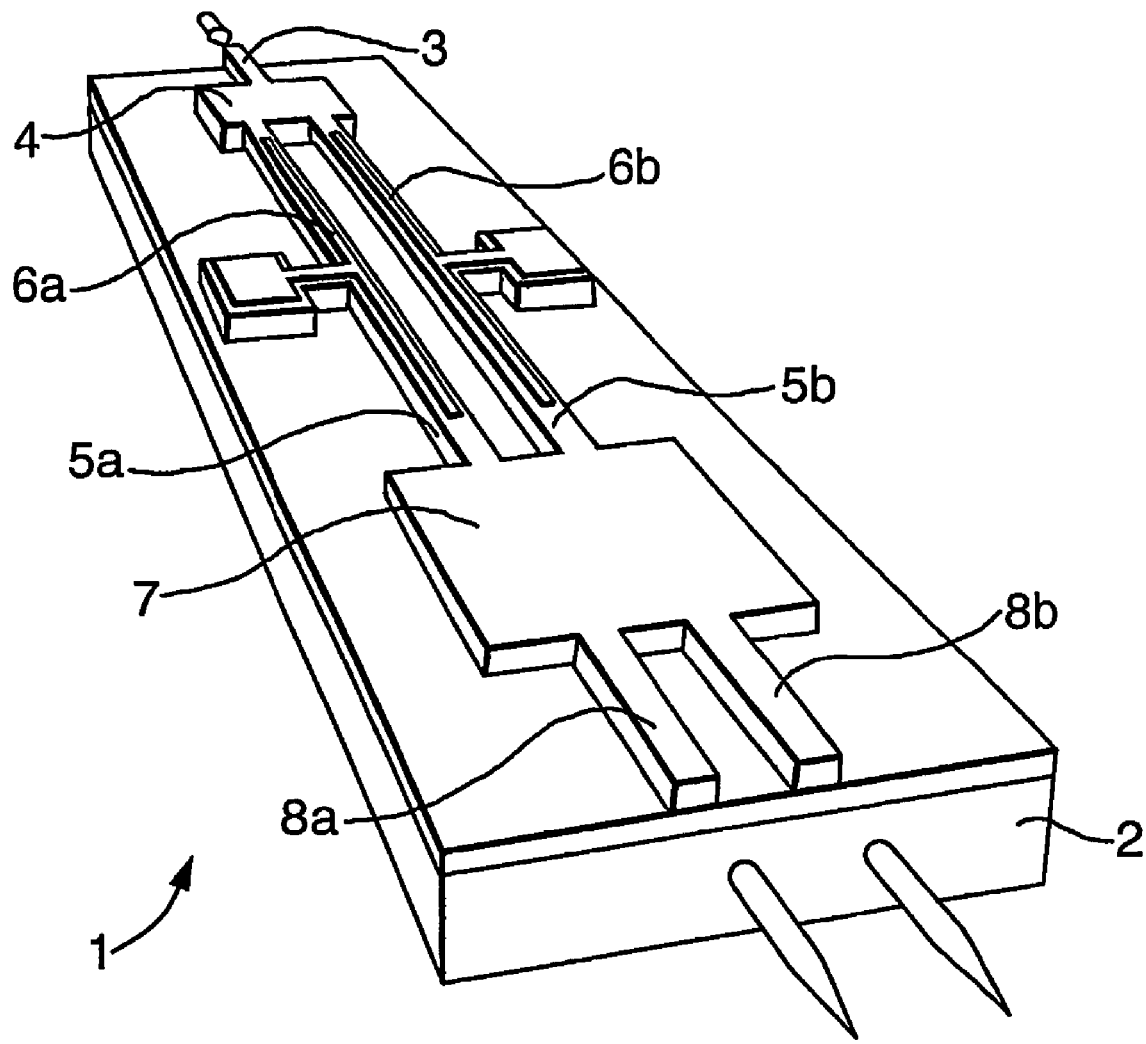
FIG. 1 shows a schematic diagram of a conventional two-channel electro-optic waveguide interferometer switch.

Referring to FIG. 1, a conventional two-channel electro-optic waveguide Mach Zehnder interferometer switch (1) comprises a substrate (2) upon which is fabricated an input waveguide (3), a 1×2 splitter (4), two electro-optic waveguides (5a, 5b), electro-optic electrodes (6a, 6b) deposited on top of the electro-optic waveguides (5a, 5b), a 2×2 recombiner (7) and two output waveguides (8a, 8b).

For the purposes of this specification the electro-optic waveguide(s) shall comprise any optical waveguide wherein the optical properties of the waveguide may be actively altered in response to an applied electric field. For example, the refractive index of the electro-optic waveguide core may be alterable via the linear electro-optic effect (Pockels effect), which in turn may be used to alter the phase of light passing through the electro-optic waveguide. The electric field shall be applied to the electro-optic waveguide via the electro-optic electrodes.

In use, light enters the electro-optic waveguide Mach Zehnder interferometer switch via the input waveguide (3), passes through the 1×2 splitter (4) into two electro-optic waveguides guides (5a, 5b), is recombined in the 2×2 recombiner (7) and leaves the device through the two output waveguides (8a, 8b). By applying a voltage, either between the two top electro-optic electrodes (6a and 6b), or one top electro-optic electrode (6a,6b) and an electro-optic electrode on the conducting lower cladding (6c, not shown), the light can be switched from one output waveguide (8a,8b) to another.

Figure 2:
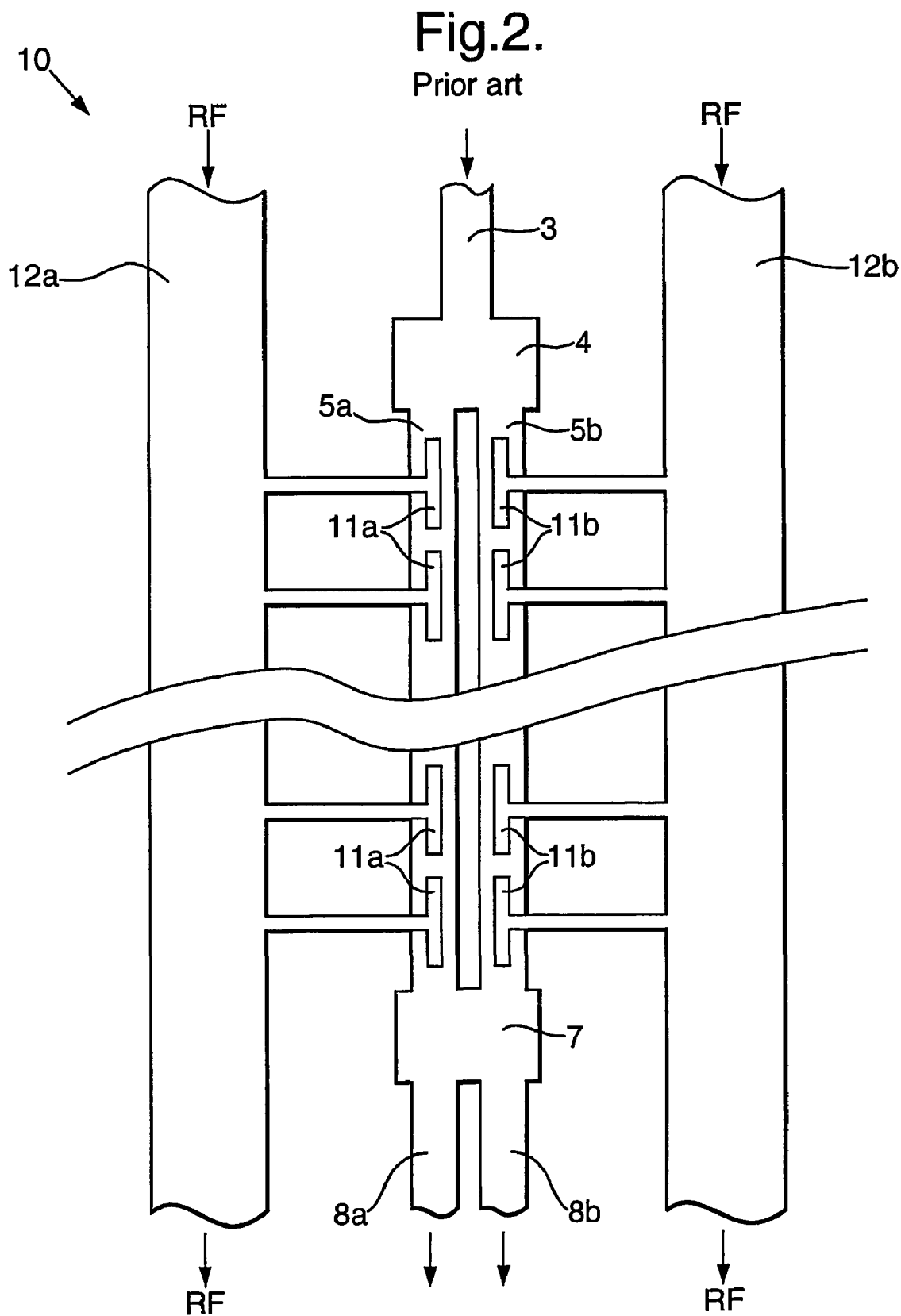
FIG. 2 shows a schematic diagram (plan view) of a conventional two-channel travelling wave radio frequency (RF) electro-optic modulator.

Referring to FIG. 2, a conventional two-channel travelling wave radio frequency (RF) electro-optic modulator (10) includes many of the elements of the basic Mach Zehnder interferometer switch including a substrate (2) (not shown) upon which the device is fabricated, an input waveguide (3), a 1×2 splitter (4), two electro-optic waveguides (5a, 5b), a 2×2 recombiner (7) and two output waveguides (8a, 8b).

However, in the travelling wave RF electro-optic modulator the electro-optic electrodes (6a,6b) are replaced by multiple electro-optic electrodes (11a, 11b) connected to coplanar stripline (CPS) primary electrodes (12a, 12b) arranged adjacent to the electro-optic waveguides and extending along the length of the electro-optic waveguides. The primary electrodes ensure correct propagation of the electrical signal within the device and deliver the electrical signal to multiple electro-optic electrodes. In use, the RF drive signal (with a typical frequency of the order of 50 GHz) is injected into one end of the CPS primary electrodes. The CPS primary electrodes ensure that the RF wave travels along the device in the same direction, and at the same speed, as light entering the RF electro-optic modulator at the input waveguide (3). In this manner the same part of the RF wave always acts on the same part of the light beam, and the required optical phase shift grows continuously as the light propagates along the device.

The RF drive signal exits the RF electro-optic modulator at the other end of the CPS primary electrodes.

The use of CPS primary electrodes with multiple short electro-optic electrodes (11a, 11b) also has a beneficial effect of avoiding the undesirable capacitive effects of a single pair of long electro-optic electrodes, which would severely reduce the switching speed of the modulator ["High-speed III–V semiconductor intensity modulators", Walker R G, IEEE Journal of Quantum Electronics, 27: (3) 654–667 March 1991].

Figure 3:
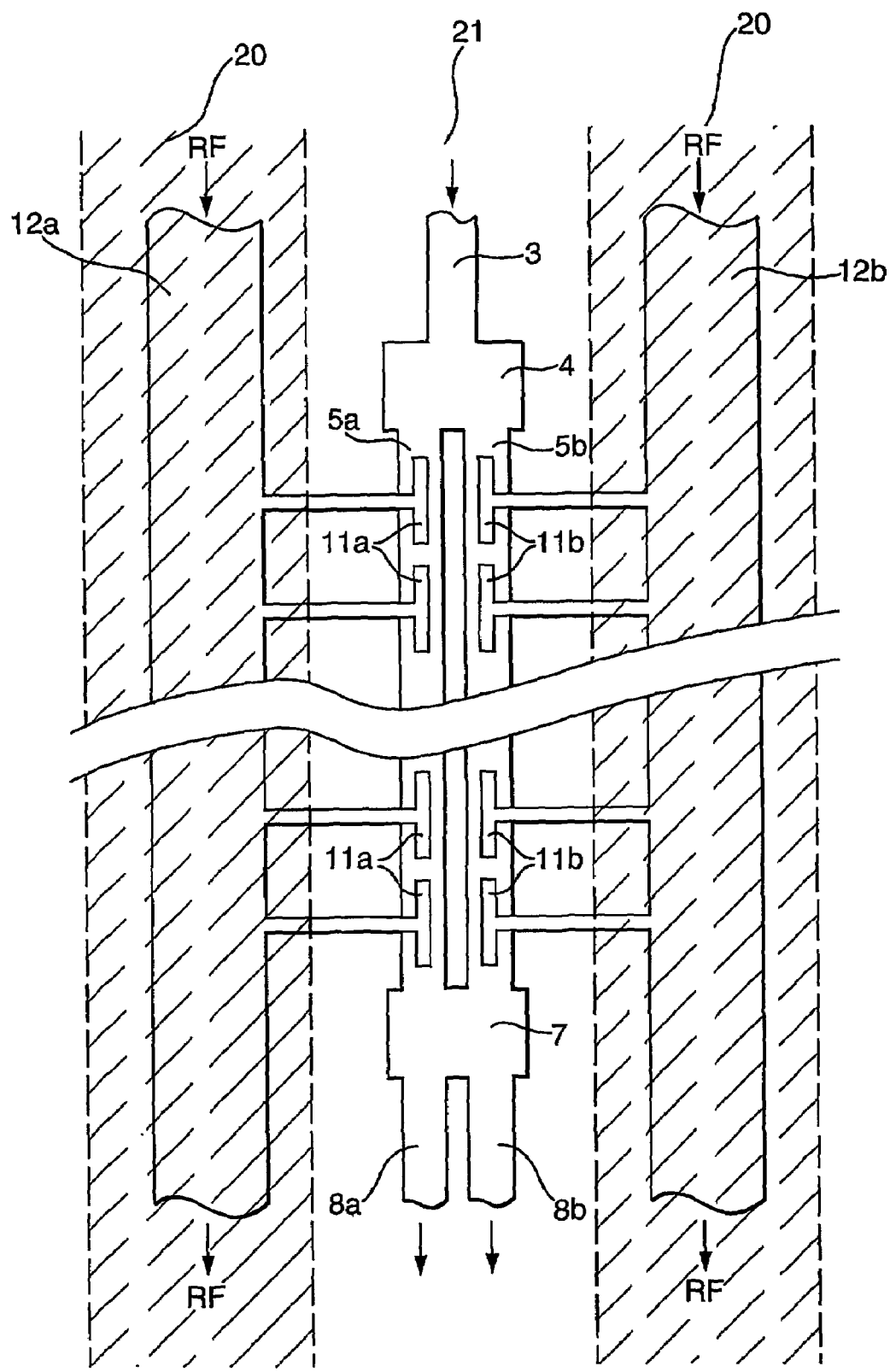
FIG. 3 shows a schematic diagram (plan view, not to scale) of the ion implanted regions of the travelling wave electro-optic modulator.

Referring to FIG. 3, the improved method for fabricating a travelling-wave electro-optic waveguide modulator utilises selective ion implantation of the semiconductor substrate, as part of the initial wafer processing, to form conducting and insulating regions on the substrate.

The method of the present invention comprises identifying primary and secondary regions within the modulator onto which the primary electrode(s) and the optical waveguide(s) respectively will be fabricated. The method includes a selective passivation process wherein ions are implanted into the primary regions on the modulator underlying the coplanar stripline primary electrodes, thereby rendering the primary regions insulating. The epitaxial layers underlying the optical waveguide are maintained as conducting layers.

Regions (20) of the semiconductor substrate (2) which will subsequently support the CPS primary electrodes are implanted with ions to form insulating areas on the semiconductor substrate. Conversely, regions (21) of the semiconductor substrate (2) which will subsequently support the electro-optic waveguide are not implanted with ions and therefore remain conducting areas on the semiconductor substrate.

Referring to FIG. 4, the process for fabricating the ion-implanted modulator typically comprises several sequential stages during which specific areas on the substrate are implanted with ions. Referring specifically to FIG. 4a, typically the waveguide epitaxy is grown on a semi-insulating wafer substrate (2) to which a conducting epitaxial layer has been applied. A release layer (25) may be applied to the semiconductor substrate to facilitate removal of the subsequent photoresist layer (27) and a conformal gold coating (26) deposited onto the release layer. A conformal layer of photoresist (27) is applied to the semiconductor wafer and patterned using conventional photolithography. For example, the wafer may be exposed through a mask to define the areas which will subsequently be implanted with ions. Alternatively, the photoresist may be patterned directly using an electron beam (electron-beam writing). The photoresist is developed in the conventional manner.

Figure 4A:
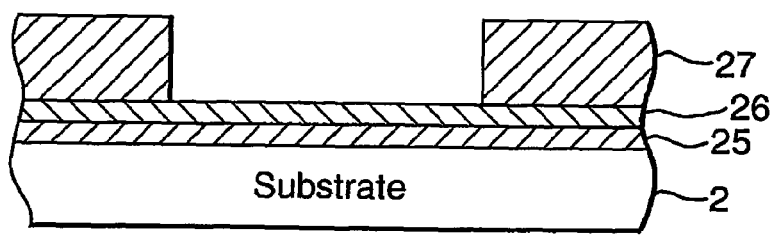
FIG. 4 shows cross-sectional views through the centre of a travelling wave RF electro-optic modulator during fabrication and illustrates schematically the sequential steps of the ion implantation isolation process.
Figure 4B:
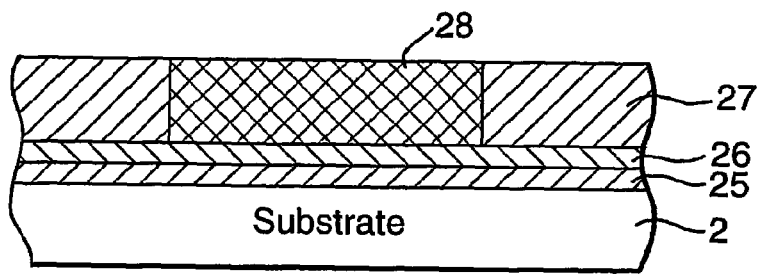

Referring specifically to FIG. 4b, the wafer is coated with a (nominally) 7 µm thick gold layer (28). The gold may be deposited by electroplating the wafer or any alternative conventional deposition technique.

Figure 4C:
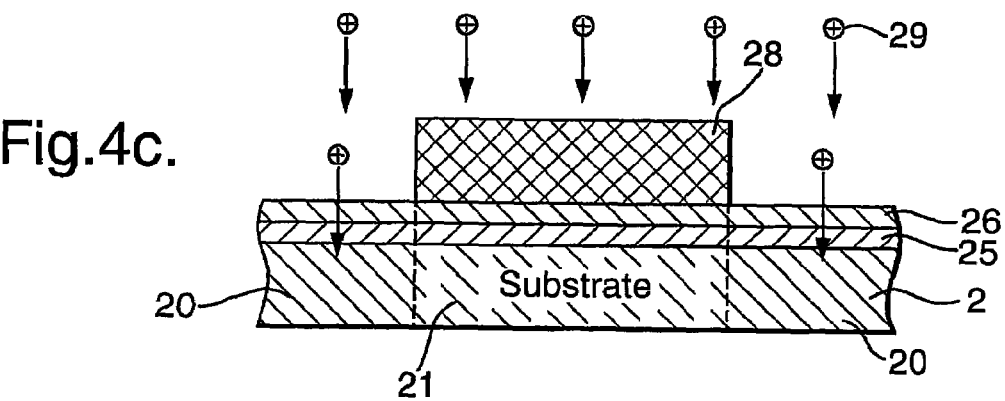
Figure 4D:
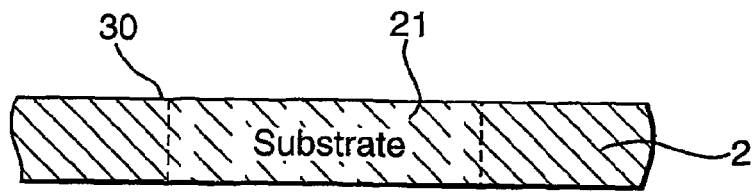

Referring to FIG. 4c, the remaining photoresist material is removed from the wafer to reveal pillars of gold (nominally 7 µm thick) which form the mask for the ion implantation process. The gold pattern mask obscures the underlying epitaxy during the implantation process so that regions (21) underneath the gold mask are not ion implanted. These regions (21) remain conducting and the waveguides in the finished device will pass through these regions. When the wafer is ion implanted, using 1.8 MeV H+ ions (29), to a depth of around 8 µm (i.e. through all of the epitaxial layers to the semi-insulating substrate), all of the region (20) not masked by the gold becomes insulating (FIG. 4d). The ion implantation generates traps which remove the electrons from the conduction band (and holes from the valence band) in the doped semiconductor layers.

The ion implantation process may also involve actively controlling the direction of the ion beam (a process known as ion beam writing) to augment the effect of the gold ion implantation mask, thereby improving the effectiveness of the ion implantation process.

The ion implantation process may be further controlled by altering the ion implantation energy or by utilising different species of ions. Practical ion implantation depths lie in the range 8 µm to 30 µm inclusive. Moreover, ions may be implanted using multiple ion implantation energies to achieve a particular profile of implanted ions at differing depths within the wafer.

In addition to altering the ion implantation energy, alternative species of ions may be employed. For example, $H_2^+$ ions (singly ionised $H_2$ molecules), helium ions, boron ions or any low atomic mass ions may be substituted for the $H^+$ ions.

The use of low atomic mass ions has the further advantage that lower acceleration fields may be employed to implant ions at a given depth in the wafer. In the case of $H^+$ ions, ion energies in the range 1 MeV to 1.8 MeV inclusive are sufficient to implant the $H^+$ ions at depths up to 10 µm in GaAs (substrate)/AlGaAs (waveguide) layers.

Figure 4E:
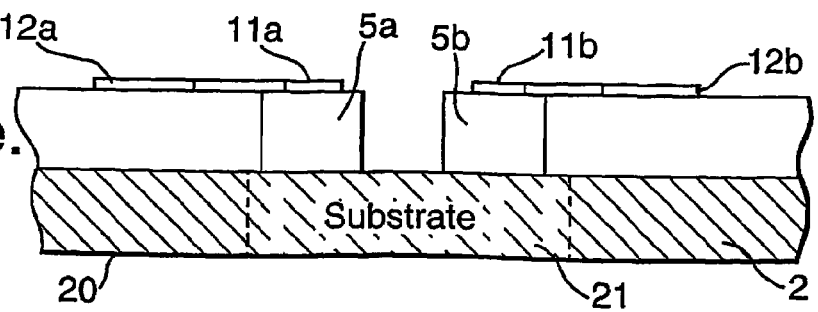

Referring to FIG. 4e, the CPS microwave primary electrode (12a, 12b) can then run across the insulating (ion implanted) regions (20) with negligible excess loss whilst the electro-optic waveguides can run across the conducting regions (21) with negligible optical attenuation.

Electro-optic waveguide devices fabricated using the aforementioned ion implantation process have been characterised using optical and RF on-wafer measurements to determine the effectiveness of the process.

Referring to FIG. 5, RF on-wafer measurements of the CPS line loss shows losses of approximately 2 dB/cm at 45 GHz. Although the loss of the ion implanted line is slightly higher than the loss of the line on the semi-insulating substrate, it is very low compared to the corresponding losses on similar devices which have not been ion implanted.

It is very clear from both RF (FIG. 5) and optical measurements (FIG. 6) that the ion implanted regions (20) are close to the ideal semi-insulating material required for low-loss RF transmission lines, and the non-isolated regions (21) are close to the ideal epitaxy required for low-loss electro-optic waveguides.

FIG. 6 refers to optical results from an ion implanted Mach Zehnder interferometer and shows the intensity of light emerging from output port 1 (40) and output port 2 (42) of the interferometer with applied bias voltage (44) over a 40 volt range. Light from the ion implanted Mach Zehnder interferometer switches from output guide 1 to 2 (and back again) sinusoidally, as the bias voltage is changed. This is the characteristic behaviour of a Mach Zehnder interferometer. The figure confirms that the performance of the optical waveguide part of the device has not been affected by the ion implantation process.

This method of combining RF and optical functions on a wafer is relatively tolerant to variations in the ion implantation conditions.

Referring to FIG. 4d, this method of combining RF and optical functions on a wafer also has the very distinct advantage that (unlike conventional methods) the ion implantation process leaves the wafer surface (30) unchanged (i.e. planar) which is essential for further high resolution lithography required to make the electrodes and waveguides.

The ion implanted region within the device attenuates light very strongly by absorption. This means that if a waveguide passes through an ion implanted region the loss will increase very significantly. This can be used deliberately to attenuate unwanted light in a chip design, rather than scattering it into the substrate of the device.

Similarly, regions within the device which have not been ion implanted attenuate RF waves very strongly and such regions could be used deliberately to attenuate RF signals rather than allowing them to be scattered within the device.

The invention claimed is:

1. A method of fabricating an electro-optic waveguide device, having primary electrodes and at least one optical waveguide disposed on a substrate having a substantially conducting surface, comprising the steps of:
   identifying at least one primary region on the waveguide device substrate to receive the primary electrodes;
   identifying at least one secondary region on the waveguide device substrate to receive the at least one optical waveguide; and
   selectively implanting ions into the at least one primary region on the waveguide device substrate identified to receive the primary electrodes, thereby rendering the at least one primary region substantially electrically insulating and leaving the at least one secondary region substantially electrically conducting.

2. A method according to claim 1 wherein the substrate is substantially electrically insulating and further comprising the initial step of growing at least one epitaxial layer onto the substrate to form a substrate exhibiting a composite structure, wherein the epitaxial layer is a substantially electrically conducting layer.

3. A method according to claim 2 wherein the substrate and the at least one epitaxial layer comprise III–V semiconductors.

4. A method according to claim 3 wherein the substrate and the at least one epitaxial layer comprise layers of gallium arsenide and gallium aluminium arsenide.

5. A method according to claim 3 wherein the substrate and the at least one epitaxial layer comprise layers of indium phosphide and indium gallium arsenide phosphide.

6. A method according to claim 1 wherein the surface of the substrate is substantially planar following the ion-implantation process.

7. A method according to claim 1 and further comprising the steps of:
   depositing epitaxial layers of semiconductor material to form an electro-optic layer in the plane of the waveguide device substrate;
   etching channels through the electro-optic epitaxial layer to form electro-optic waveguides adapted to guide light in well defined regions on the waveguide device substrate, said electro-optic waveguides being coincidental with the at least one secondary region on the waveguide device substrate identified to receive the at least one optical waveguide:
   depositing electro-optic electrodes onto at least part of the electro-optic waveguides, thereby enabling an electric field to be applied across the electro-optic waveguides; and
   depositing primary electrodes adjacent to the electro-optic electrodes and coincidental with the at least one primary region on the modulator substrate identified to receive the primary electrodes.

8. A method according to claim 1 wherein the ions comprise at least one of hydrogen ions, helium ions, or boron ions.

9. A method according to claim 1 wherein the ions exhibit energies in the range 1 MeV–1.8 MeV.

10. A method according to claim 1 wherein the electro-optic waveguide device is a travelling-wave electro-optic modulator.

11. A method according to claim 10 wherein the travelling wave electro-optic modulator is an intensity modulator.

12. A method according to claim 10 wherein the travelling wave electro-optic modulator is a phase modulator.

13. A method according to claim 10 wherein the travelling wave electro-optic modulator is a switch.

14. An electro-optic waveguide device comprising:
a substrate;
at least one input optical waveguide and at least one output optical waveguide;
at least one electro-optic waveguide:
at least one primary electrode disposed on the substrate:
at least one substantially electrically insulating primary region formed on the substrate by implanting ions into the at least one primary region: and
at least one substantially electrically conducting secondary region formed on the substrate wherein the at least one primary electrode is located on the at least one substantially electrically insulating primary region on the substrate and wherein the at least one electro-optic waveguide is located on the at least one substantially electrically conducting secondary region on the substrate.

15. An electro-optic waveguide device according to claim 14 wherein the substrate comprises a substantially electrically insulating base stratum and at least one epitaxial layer deposited onto the base stratum, wherein the at least one epitaxial layer is a substantially electrically conducting layer.

16. An electro-optic waveguide device according to claim 15 wherein the substrate and the at least one epitaxial layer comprise III–V semiconductors.

17. An electro-optic waveguide device according to claim 16 wherein the substrate and the at least one epitaxial layer comprise layers of gallium arsenide and gallium aluminium arsenide.

18. An electro-optic waveguide device according to claim 16 wherein the substrate and the at least one epitaxial layer comprise layers of indium phosphide and indium gallium arsenide phosphide.

19. An electro-optic waveguide device according to claim 14 and further comprising electro-optic electrodes deposited onto the at least one electro-optic waveguide, thereby enabling an electric field to be applied across the at least one electro-optic waveguide.

20. An electro-optic waveguide device according to claim 14 wherein the ions implanted into the at least one primary region comprise at least one of hydrogen ions, helium ions or boron ions.

21. An electro-optic waveguide device according to claim 14 wherein the ions implanted into the at least one primary region exhibit energies in the range 1 MeV–1.8 MeV.

22. An electro-optic waveguide device according to claim 14 wherein the electro-optic waveguide device is a travelling-wave electro-optic modulator.

23. A travelling wave electro-optic modulator according to claim 22 wherein the travelling wave electro-optic modulator is an intensity modulator.

24. A travelling wave electro-optic modulator according to claim 22 wherein the travelling wave electro-optic modulator is a phase modulator.

25. A travelling wave electro-optic modulator according to claim 22 wherein the travelling wave electro-optic modulator is a switch.

* * * * *